United States Patent [19]

Grossman et al.

[11] 4,381,548
[45] Apr. 26, 1983

[54] APPARATUS AND METHOD FOR GUIDING VEHICLE WHEEL ALIGNMENT ADJUSTMENTS TO KNOWN ALIGNMENT REQUIREMENTS

[75] Inventors: James M. Grossman, Chesterfield; Daniel B. January, Bel Ridge, both of Mo.

[73] Assignee: Hunter Engineering Company, Bridgeton, Mo.

[21] Appl. No.: 178,747

[22] Filed: Aug. 18, 1980

[51] Int. Cl.³ ............................................. G01B 5/24
[52] U.S. Cl. .................................. 364/551; 33/288; 356/155; 364/559
[58] Field of Search ............... 364/424, 425, 521, 525, 364/550, 551, 556, 559; 33/203.12, 203.18, 288, 335; 340/286 M; 356/155, 388, 392, 393, 399

[56] References Cited

U.S. PATENT DOCUMENTS

| | | | |
|---|---|---|---|
| 3,782,831 | 1/1974 | Senften | 356/152 |
| 3,892,042 | 7/1975 | Senften | 33/301 |
| 4,034,479 | 7/1977 | Senften | 33/203.15 |
| 4,106,208 | 8/1978 | Hunter | 33/288 |
| 4,126,943 | 11/1978 | Senften | 33/228 |
| 4,138,825 | 2/1979 | Pelta | 33/203.18 |
| 4,143,970 | 3/1979 | Lill | 356/155 |
| 4,176,396 | 11/1979 | Howatt | 364/551 |
| 4,302,104 | 11/1981 | Hunter | 33/288 |
| 4,319,838 | 3/1982 | Grossman | 33/288 |

FOREIGN PATENT DOCUMENTS 2025064 1/1980 United Kingdom ............ 33/203.18

*Primary Examiner*—Errol A. Krass
*Attorney, Agent, or Firm*—Gravely, Lieder & Woodruff

[57] ABSTRACT

Apparatus for guiding the alignment adjustment on vehicle wheels in which a computer is used to receive vehicle alignment specifications and tolerances data for a known vehicle, and to receive actual alignment information from that known vehicle, these two sources of alignment data being conditioned such that on recall it can be displayed in visual format or through a system of light bars which are driven by the computer to display only differences between the known vehicle specifications and tolerance data and the actual alignment data. The display of alignment data and actual data is made available on a CRT screen, as well as being transmitted to a portable display for movement about a vehicle during alignment adjustment.

19 Claims, 9 Drawing Figures

```
        ENTER SPECIFICATIONS

TOE UNITS - IN.

SPEC.        TOL.
FRONT
  LEFT   CAMBER           3/4←         1/4
  RIGHT  CAMBER           1/2          1/4
  CASTER                  3.0          1/4
  TOTAL  TOE              1/8          1/16

REAR
  CAMBER                   O           1/4
  TOTAL  TOE               O           1/16
```

*FIG. 3C*

```
         ALIGNMENT ADJUSTMENTS

LEFT        RIGHT
FRONT  CAMBER              .2           .O
FRONT  CASTER              .O         - .5
REAR   CAMBER              .1           .1

UPPER CONTROL ARM ADJUSTMENTS
                          LEFT        RIGHT
FRONT  SHIMS             - 1/16      - 1/32
REAR   SHIMS             - 1/16      - 1/32

TOE ADJUSTMENTS (IN )
                  LEFT      RIGHT     TOTAL
FRONT              .01      - .02    - .01
REAR             - .02        .02      .00
```

*FIG. 3D*

APPARATUS AND METHOD FOR GUIDING VEHICLE WHEEL ALIGNMENT ADJUSTMENTS TO KNOWN ALIGNMENT REQUIREMENTS

BACKGROUND OF THE INVENTION

1. Field of the Invention

This invention relates to apparatus and to method which guides the adjustments in the alignment of vehicle wheels to known original specifications.

2. Description of the Prior Art

Vehicle wheel alignment apparatus is known to embody instruments carried by the vehicle wheels for generating signals indicative of the wheel positions, and display means connected to the instruments for visually illustrating the alignment positions. Prior art includes patents issued to Senften U.S. Pat. Nos. 3,782,831 of Jan. 1, 1974; 3,892,042 of July 1, 1975; 4,034,479 of July 12, 1977; and 4,126,943 of Nov. 28, 1978. A further disclosure has been made in Hunter U.S. Pat. No. 4,106,208 issued Aug. 15, 1978.

It is known in this field that service people, when making adjustments on the steering mechanism under the vehicle have to see the hands (or needles) on the display dials so that movement in the correct direction can be detected. However, before the display can be interpreted, the desired alignment specification parameters need to be known. Thus, up to the present time, service people have been required to make notes or memorize alignment specification requirements to obtain effective alignment results.

It is obviously unhandy for a service person working under a vehicle to be in a position to note the needle motion that is taking place on the dials associated with the alignment instrumentation. Some instrumentation has been made so as to be portable, yielding a somewhat improved relationship for service people working under a vehicle to observe alignment instrumentation. Proper wheel alignment is extremely important to the safe operation of vehicles, and adjustment in wheel alignment is rendered difficult when the instrumentation cannot be easily observed. Furthermore, service people are required to memorize or make written notations of the alignment parameters for each vehicle being worked on.

BRIEF SUMMARY OF THE INVENTION

The problems discussed above are overcome by the present apparatus which embodies unique features in which vehicle wheel alignment information can be provided in connection with a unique way of displaying wheel adjustments, and by the use of a portable adjustment display which may be carried around the vehicle from wheel to wheel.

The present apparatus for guiding vehicle wheel alignment includes a computer which is easily programmed to store wheel alignment parameters for any given vehicle, together with tolerances which are to be reached during adjustment. The computer is associated with a manual keyboard which controls the information to be incorporated in the computer memory system so that vehicle wheel alignment specification information can be entered by the service person into the computer along with the designated tolerances. In order for specifications and tolerances to be verified, the computer is connected to a standard cathode ray tube which will display the alignment specification information, whereby service people can be certain that the computer memory has been properly loaded. Instrumentation mounted on the vehicle wheels is connected into the computer so that as individual wheel position information is determined, it can be stored for subsequent comparison with the desired alignment specification information. A final item of apparatus is the portable adjustment indicator which may be carried around the vehicle from wheel to wheel for easy observation as wheel alignment adjustments are made as required. The preferred embodiment of the portable adjustment indicator includes a pair of light bars, and circuitry relating the light bars to the wheel adjustment parameters such as left and right rear wheel camber and toe information, and front wheel left and right camber, caster and toe. In addition, alignment information is displayed with respect to caster turn to direct the service person through the caster measurement procedure. The light bars are connected into circuitry between the adjustment box and the computer so that for any of the wheel alignment measurements being investigated, the stored information in the computer drives the light bars, and the light bars respond in such a manner to indicate the magnitude and direction of deviation of the particular alignment parameter from the desired specification which has been loaded into the computer memory.

BRIEF DESCRIPTION OF THE DRAWINGS

The apparatus making up the preferred embodiment of the present invention is illustrated in the accompanying drawings wherein:

FIGS. 3A to 3D depict a sequence of views of the face of the cathode ray tube, each one displaying different information for guiding the investigation of vehicle wheel alignment parameters;

DETAILED DESCRIPTION OF THE PREFERRED EMBODIMENT

Figure 1:
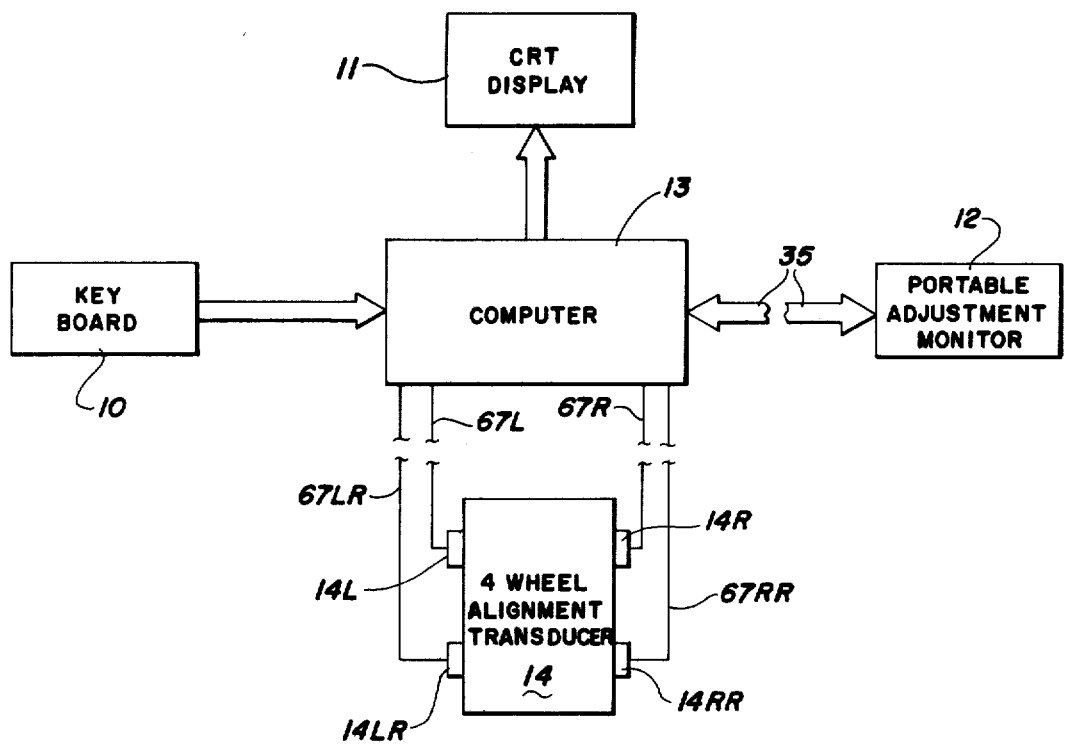
FIG. 1 is a diagrammatic layout of the various items of apparatus, including the keyboard, the cathode ray tube, the alignment instrumentation on the vehicle wheels, and the portable adjustment indicator, all of which are associated with a computer.

The preferred embodiment of the apparatus, shown in a diagrammatic layout in FIG. 1, consists of five primary parts: a keyboard 10, a cathode ray tube (CRT) video display 11, a portable adjustment indicator 12, a computer 13, and the necessary alignment signal producing instruments shown only in block form at 14L, 14R, 14LR and 14RR on a vehicle silhouette 14 for measuring the alignment parameters of the vehicle.

The computer 13 is used as a controller, in the sense that it responds to the input it receives from the service person using the keyboard 10 and the signals it receives from the angle measuring instruments mounted on the wheels of the vehicle 14 to produce, in a defined and specified manner, displays appearing on the CRT monitor 11 and portable adjustment indicator 12 which allows the service person to align the vehicle wheels. The computer 13 is one of several embodiments which can accomplish this function and is preferred due to its low cost, few parts, ease of implementation, and versatility. The computer 13 will be described in greater detail presently.

The CRT video display 11 embodies an industry standard, 12 inch, black and white monitor, driven by the computer 13 over an industry standard TTL (transistor-transistor logic) or DD (direct drive) three line interface (horizontal sync, vertical sync, and video). The monitor is commercially available from many sources, such as Zenith or Motorola. Circuits within the computer 13 drive the CRT 11 such that characters, words, and numbers appear on the screen in a readable format. The computer 13 can be programmed to make the desired letters and numbers appear anywhere within a field of the display consisting of sixteen lines each thirty-two characters long.

The service person uses the keyboard 10 to select information for display on the screen of the CRT 11, and to enter the desired alignment specifications and tolerances. The preferred embodiment of the keyboard 10 is a sealed membrane type, with or without tactile feedback. This type of keyboard is constructed from two layers of mylar plastic, separated by a spacer material such that contact is made between the two layers when pressure is applied on the top layer. Current paths are painted on both mylar layers with a conductive silver ink, such that a closed circuit is formed at the point of contact of the two layers. Overlying this sandwich assembly is a layer 15 of clear polycarbonate plastic painted on the reverse side with the key areas and legends clearly visible. Labels and descriptive artwork may be added as needed. The keyboard 10 is sealed so that the legends and artwork are kept safe from the corrosive fumes and liquids of the garage or service shop environment. Keyboards of this construction are commercially available from a source such as W. H. Brady Co. or Molex, Incorporated.

Figure 2:
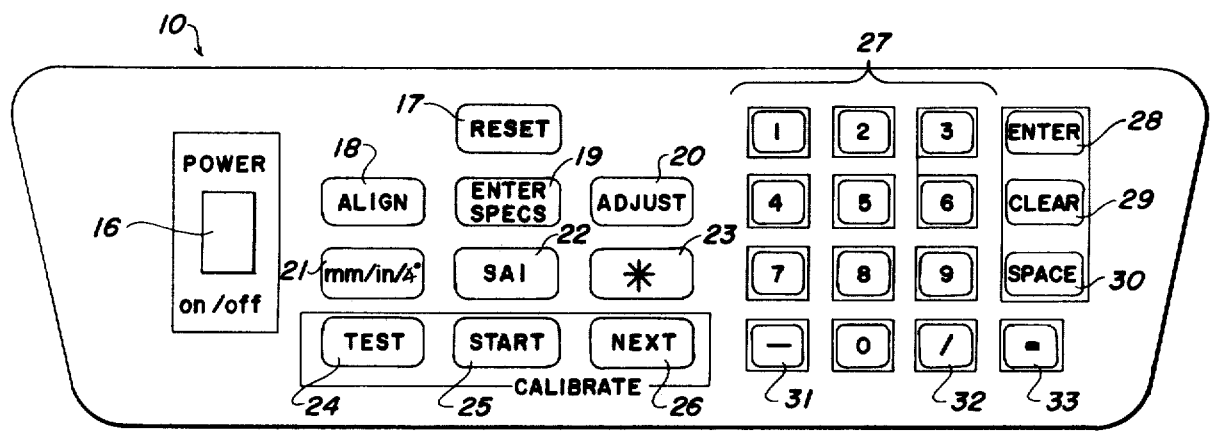
FIG. 2 is an enlarged face view of the keyboard herein preferred.

The face view of keyboard 10 is seen in FIG. 2, and at the left side is a power switch 16 to control power to the entire alignment apparatus of FIG. 1. Adjacent the power switch is a group of function keys, such as RESET 17, ALIGN 18, ENTER SPECS 19, ADJUST 20, mm/in./⌁° 21, SAI 22, ASTERISK symbol 13, TEST 24, START 25, and NEXT 26. Reference will be made to one or more of these switches in the following description. These function keys are used to select information for display on the screen of the CRT 11. The keyboard 10 also incorporates a numerical entry group of keys carrying the Arabic numbers from zero to nine, and collectively referred to as keys 27. These keys 27 are used to enter alignment specifications and tolerances in the computer 13.

Wheel alignment angle measuring instruments 14L, 14R, 14LR and 14RR are mounted on the vehicle wheels and are electronically compensated for aberrations in the wheel mountings on the vehicle and in the instrument mounting on the wheels, all as taught in the copending patent application of Grossman et al, Ser. No. 080,274, filed Oct. 1, 1979, entitled Vehicle Wheel Alignment Apparatus, now U.S. Pat. No. 4,319,838 of Mar. 16, 1982 and as taught in the copending patent application of January et al, Ser. No. 172,815, filed July 28, 1980 and entitled Method of Effecting Compensation of Cooperatively Coupled Vehicle Wheel Alignment Instruments now U.S. Pat. No. 4,336,658 of June 29, 1982. The disclosures in both of these applications are incorporated herein by reference. The instruments 14L, 14R, 14LR and 14RR generate signals received by the computer 13, and are understood by the computer in terms of the angles measured by the instruments, such as toe-in, set back, thrust angle, camber and caster. The service person uses the keyboard 10 to instruct the computer 13 to display the alignment angles, and that is accomplished in the format shown in FIGS. 3A to 3D.

Figures 3A, 3B:

When the RESET key 17 is pressed on keyboard 10, computer 13 responds by presenting a picture on the screen of CRT 11, seen in FIG. 3A. Similarly, pressing the ALIGN key 18 causes the CRT screen to display the picture seen in FIG. 3B. Pressing the ENTER SPECS key 19 causes the CRT screen to display the picture seen in FIG. 3C, and on pressing the ADJUST key 20, the CRT causes the picture in FIG. 3D to appear. The key 21 is used to select the units for the toe displays, such as millimeters "mm", or inches "in." or degrees " ⌁ '", when desired. If steering axis inclination SAI is to be measured, key 22 is pressed. Other information can be displayed in relation to keys 24, 25 and 26, and key 23 is provided to accommodate expanding the function of the system, but none of these key controlled functions will be set forth.

Upon pressing key 17 RESET, the words READY FOR ALIGNMENT will appear on the screen of CRT 11, as in FIG. 3A. This indicates that the apparatus is in a standby or reset mode in which all previously entered compensation values, specifications and tolerances are erased from the computer memory. When key 18 ALIGN is pressed, the computer 13 leaves the reset mode and begins operating by receiving signals generated by the instruments 14L, 14R, 14LR and 14RR (FIG. 1) from which the alignment angles of the vehicle 14 are computed and displayed on the screen of the CRT 11, as in FIG. 3B.

This is the normal alignment information for the vehicle: camber, caster and toe of the wheels, and the axle symmetry parameters, such as set back and thrust angle. As seen in FIG. 3B, representative measurements for a vehicle have been inserted to illustrate that this display represents a significant advancement over displays embodying meter panels (dials and needles), and it eliminates parallax and scale interpretation errors commonly associated with meters. The digital display and wording can be read without error from a considerable distance, which is a major problem with console mounted displays.

During the vehicle alignment procedure, the service person has been heretofore required to memorize or write down the required alignment specifications for the vehicle being examined. It is usually the case that constant reference must be made to the notes to use the right specification and tolerances, and these data then must be compared with the meter displays during the adjustments. The referred system overcomes these problems, and provides two methods for guiding the service person through the alignment procedure by allowing the computer 13 to take over the memory and comparison requirements, thereby making the alignment procedure easier.

The first method is practiced by using the CRT displays, and the second method is practiced by using the indicator 12. The first method is utilized by entering the alignment specification and tolerances in the computer 13 through keyboard 10. Switch 19 ENTER SPECS is pressed to which computer 13 responds by energizing the CRT 11 to display the screen of FIG. 3C. In this display there is a "cursor" adjacent the value ½ in form of an arrow pointing leftward to the current eight character field where the specification is called out. The specification values are keyed in by using the numeric key cluster 27 on keyboard 10. As each value is punched in at the cluster 27, it appears on the screen of FIG. 3C and is followed by pressing the ENTER key 28 to cause the value to be remembered by the computer 13. The keys 31, 32, 33 and 30, labelled respectively "—" (minus), "/" (slash), "." (period), and "SPACE" are provided to allow fractional and negative numeric specification values to be keyed into the display of FIG. 3C. If an error or mistake is made, the "CLEAR" key 29 is used as is well understood. Each time an acceptable value is entered in the display, the cursor arrow moves to the next field. As each specification and tolerance value is punched on the key cluster 27, or fractional value is needed by using the keys 32 or 33, and negative value is selected by key 31, it is necessary to press the ENTER key 28 before going to the next selection. Verification of the accuracy of the values can be made directly by observing the display on the screen of the CRT 11, and changes can be made.

Once the service person has keyed in the proper alignment specification for a known vehicle, it is not necessary to refer to or remember them as they are on display in FIG. 3C screen. Also, the computer 13 has the same information in its memory. Now the service person presses the ADJUST key 20, and the display of FIG. 3D appears. This display indicates the differences between the measured alignment angle and the entered specification. Thus, only those values which are not zero needs adjusting the display of FIG. 3D, it is possible to adjust the parameters to null or zero. However, this method has some limitations. A service person may not carry out adjustments to null or exact specifications, but merely adjust until he is close to that specification or within the tolerance allowed. This requires memorizing the tolerances as adjustments are made. While a better way is to observe the screen of FIG. 3D during adjustments, this is undesirable while working beneath the vehicle. Furthermore, the digital display lacks the biofeedback of analog displays, which indicate qualitatively the amount and direction of required adjustments in a form that is more easily used. Thus, the ADJUST display seen in FIG. 3D is primarily intended as a diagnostic aid, allowing quick determination of required adjustments in alignment parameters.

A further aid to adjustment provided by the ADJUST key 20 is the calculation of the shims required to adjust front camber and caster to specification, especially for General Motors type vehicles which use this shim method of adjustment. The inboard mounting points of the upper control arms are adjusted by washer-like shims. Changing equal shims at both mounting points changes camber, but not caster, while adding shims at one mounting point while removing equal shims from the other, changes caster but not camber. The shims are approximately calculated such that a one-sixteenth (1/16) inch thick shim change, equal at both mounting points of the control arm, produces a one-fourth (¼) degree camber change; and a one-thirty second (1/32) inch thick shim change, equal and opposite at both mounting points of the control arm, produces a one-half (½) degree caster change. From the camber and caster angles measured and the specifications entered, the computer 13 uses the above calculations to compute the net shim changes required. In the display of FIG. 3D, a "—" (minus) indicates shims should be removed, while the absence of such a minus sign indicates shims should be added. Thus, service persons are relieved from making these shim adjustment calculations.

Figure 4:
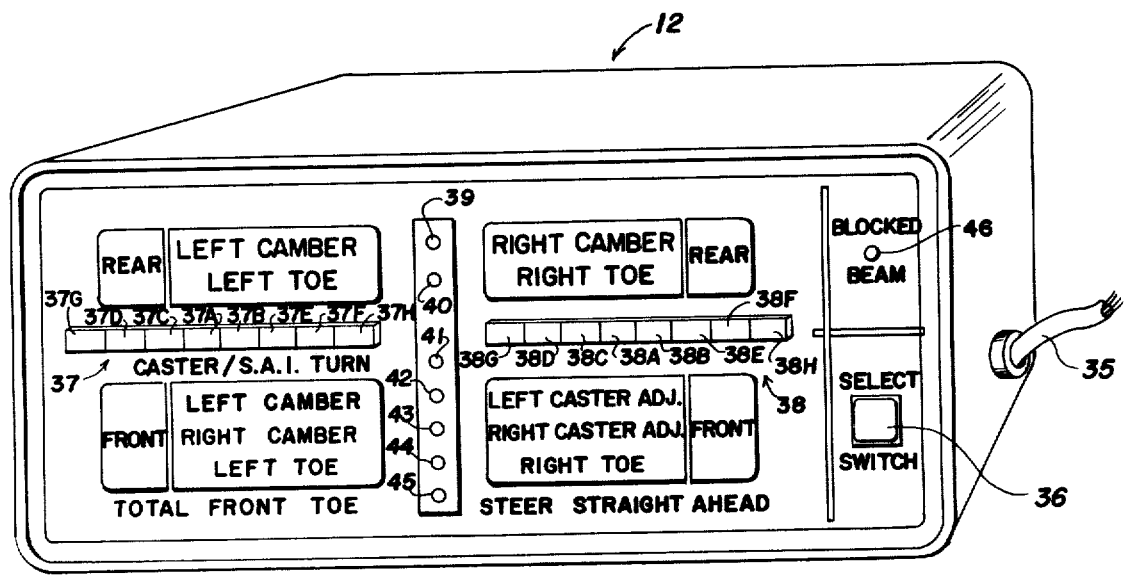
FIG. 4 is an enlarged face view of one form of portable adjustment guiding indicator showing the arrangement of the alignment display and the adjustment guiding light bars.

The second method of guiding the alignment adjustments utilizes the portable adjustment indicator 12 seen in FIG. 4. Behind the face panel 34 is a printed circuit board (not necessary to show) having all the necessary circuits associated with the information legends and indicator lights seen on the panel 34. An elongated flexible electrical cable 35 connects the indicator 12 to the computer 13, thereby allowing the indicator 12 to be carried around and under the vehicle. Presented on the face panel 34 is a momentary push button 36, and twenty-four light emitting diodes (LED). Sixteen of these LEDs are rectangular in shape and arranged in two long bar graphs 37 and 38. Bar graph 37 consists of two green LEDs 37A, 37B, four yellow LEDs 37C, 37D, 37E, 37F, and two red LEDs 37G and 37H. The bar graph 38 consists of a similar arrangement of LEDs such as: two green LEDs 38A and 38B, four yellow LEDs 38C, 38D, 38E and 38F, and two red LEDs 38G and 38H. Seven of the LEDs are round and red and are arranged in a vertical column between the left and right bar graphs and areas carrying alignment legends. These red LEDs are shown at 39, 40, 41, 42, 43, 44 and 45. The last round red LED 46 is provided to indicate when the optical path of one of the electro-optical toe angle measuring instruments on the vehicle 14 is blocked, rendering the instrument inoperable. The legend at that LED explains the problem.

The indicator 12 is used by operating the push button 36 to select the alignment item to be examined, and guide the operator through the adjustments. The bar graphs 37 and 38 can guide the alignment adjustment of only one parameter at a time, therefore the button 36 is used to make the selection. The chosen selection is indicated by illumination of one of the round red LEDs 39 to 45. For example, if the LED 39 is lit, the parameters selected are for left rear camber for bar graph 37 and right rear camber for bar graph 38. If again button 36 is pressed, the LED 39 will go out and LED 40 will be lit. Repeated pushing on button 36 will cause the LEDs 39 to 45 to be progressively lit so that the alignment menu on the panel 34 can be selected at will. The object of the bar graphs 37 and 38 is to guide the adjustments on the vehicle until the two green LEDs on the graphs are lit, indicating that the adjustment is at the required specification and within one-half the tolerance allowed. If the menu item selected is out of specification, the yellow or even the red LEDs in the bar graphs will be lit, and depending on whether they are to the right or left of the green LEDs, the direction of adjustment is shown to bring it back toward the two green LEDs. The adjustments can be made while watching the LEDs in the bar graphs 37 and 38, always adjusting to illuminate only the green LEDs.

The adjustment is guided by the computer 13 comparing the alignment parameter selected by button 36 to the specification and tolerance entered for that parameter, according to the formula $$N = \frac{\text{measured angle} - \text{specification}}{\text{tolerance}}$$

If $-\frac{1}{2} < N < +\frac{1}{2}$ then the measured angle is within half the allowed tolerance of equalling the specification. In this example, the computer 13 illuminates only the two green LEDs 37A and 37B, if left front toe is the angle to be adjusted. If $-1 < N \leq -\frac{1}{2}$ or $\frac{1}{2} \leq N < 1$, then the angle is within tolerance but is not within half the tolerance, accordingly, only one green LED 37A or 37B in this example is lit. Which of the two green LEDs is lit determines by which direction the angle is out of spec. If $\frac{1}{2} \leq N < 1$, then the angle is greater than spec., meaning the left front wheel has too much toe-in and green LED 37B is lit, indicating the left wheel is turned too far to the right. If $-1 < N \leq -\frac{1}{2}$, then the green LED 37A is lit.

Figure 5:
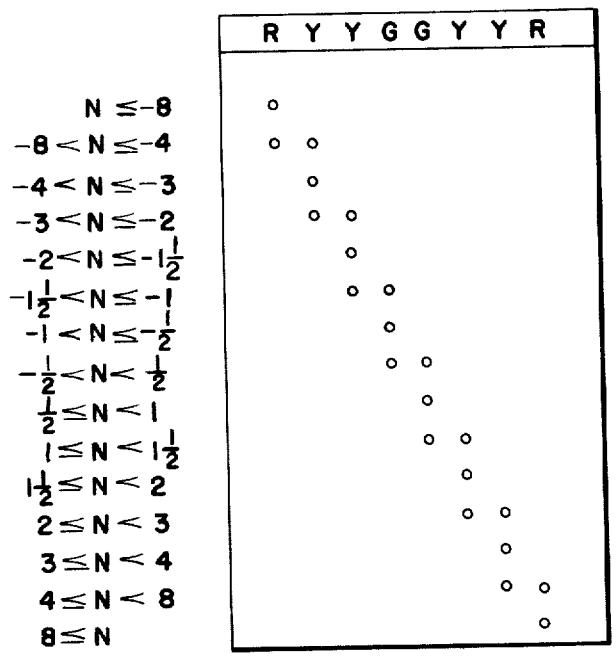
FIG. 5 is a table indicating the scaling of the bar graphs in the adjustment indicator seen in FIG. 4.

FIG. 5 illustrates, in chart format, how the bar graphs are scaled according to the tolerance entered. A circle in a vertical column and opposite a tolerance indicated horizontally to the left indicates that the LED for that column is lit, and the left margin indicates what condition required that LED to be lit. The letters across the top of the chart denote the color of the bar graph LEDs and are at the head of the vertical columns. The chart shows there are fifteen tolerance conditions to be considered.

The bar graphs 37 and 38 have great utility and are a considerable advance in the art of adjusting vehicle alignment. The specification and tolerance data is entered into the computer 13, as explained above, by using the keyboard 10, and thereafter there is no need to remember or refer to them. By using the portable indicator 12, a vehicle can be quickly and easily aligned. All the disadvantages of both digital and analog displays are eliminated, while all their advantages are retained: Parallax and meter scale interpretation errors are avoided, while digital precision and analog biofeedback are retained. By performing the alignment adjustment "to the green", the precision of the alignment is determined by the tolerances keyed into the computer 13.

The portability of the indicator 12 is a considerable aid in the measurement of front wheel caster, which is measured by turning the wheels first to the left to a pre-set toe angle and recording the camber measurement, then to the right to the opposite toe angle and measuring camber again. Caster is computed by the formula $$\text{Caster} = \frac{\Delta \text{ camber}}{\Delta \text{ toe}} \times K$$

where K is a constant. It is understood that K is $180/\pi$. This older method requires physically steering the wheel while watching the indicator on the turn plate supporting the wheel, then actuating a switch at the proper positions to cause the measurements to be made. The present portable indicator 12 assists in this wheel turn procedure in the following way:

1. The operator selects "CASTER TURN" with the switch 36 to illuminate LED 41. The left bar graph 37 will be lit and the right bar graph 38 will not be used.

2. The bar graph 37 will direct the operator to steer the wheel to the left and desired toe angle, nominally $-7.5$ degrees. The right red LED 37H will be lit, indicating the wheel is steered too far to the right. The wheel is steered to $-7.5$ degrees at which position the two green LEDs 37A and 37B will be lit because of "steering to the green."

3. At this point, the computer 13 automatically stores the camber measurements and toe measurements of both front wheels.

4. The computer 13 then directs the steering of the front wheels to $+7.5$ degrees to the right, by illuminating the left red LED 37G. Now the wheels are "steered to the green" which places the left wheel at $+7.5$ degrees.

5. Now the computer 13 automatically stores the camber measurements and toe measurements, from which it computes the caster angles of the steering axes.

Figure 6:
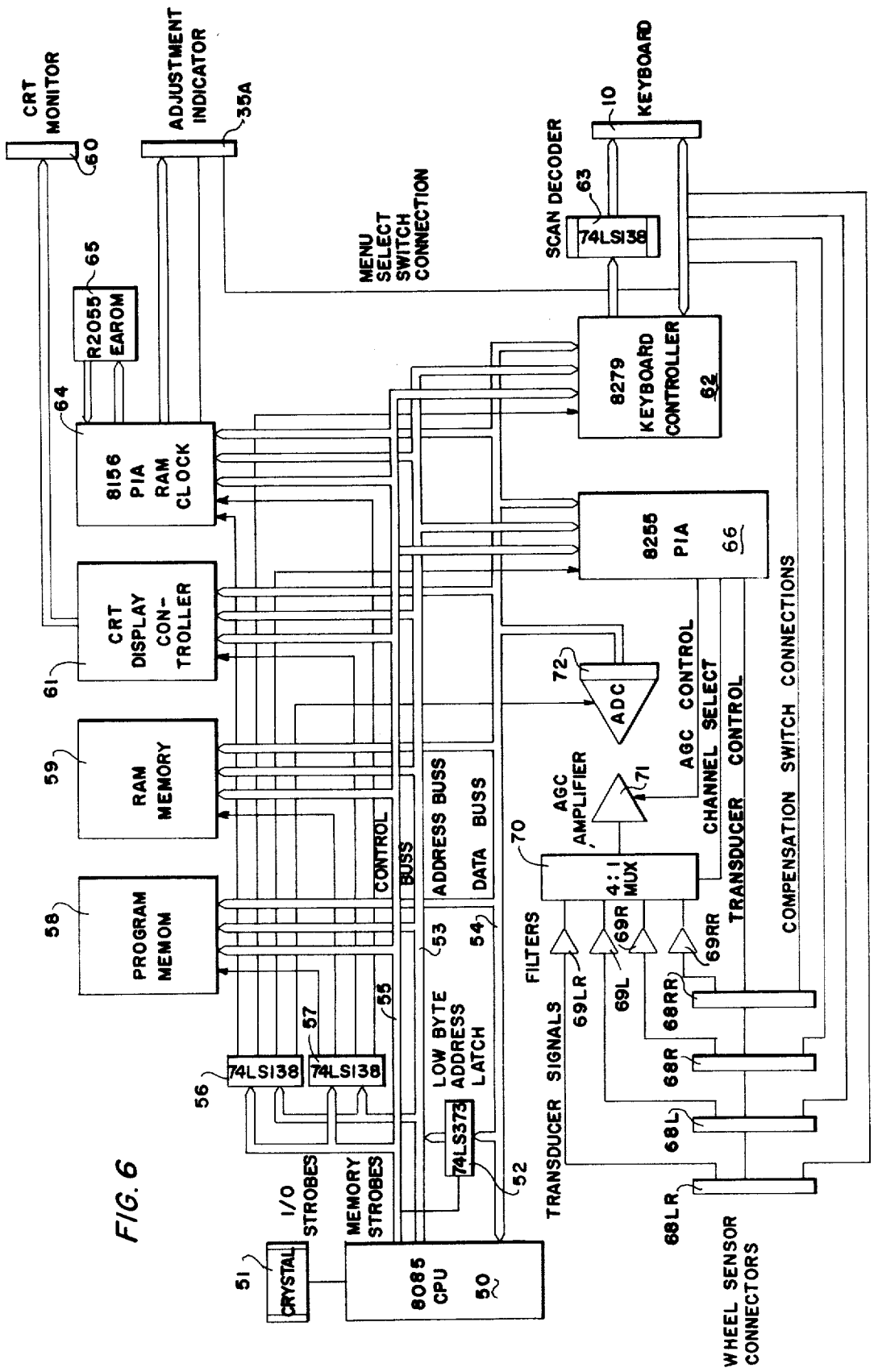
FIG. 6 is a block diagram of the computer herein preferred.

The computer 13, which is the controller for the present apparatus, is disclosed in diagrammatic format in FIG. 6 and consists of the physical devices, parts, circuits and interconnections shown. The showing in FIG. 6 is presented in keeping with the art of microprocessor-based computer design. The heart of the present computer 13 is the Intel 8085 CPU microprocessor central processing unit 50 which is one of several industry standard 8-bit NMOS microprocessors, contained in a standard 40-pin integrated circuit DIP package. The CPU 50 requires a crystal 51 to establish a time base for its clock. A standard 6.144 MHz microprocessor crystal is used. A 74LS373 octal tri-state latch 52 is required to buffer and store the low order byte of the 16-bit address buss 53. The CPU 50 is connected to various peripheral circuits through the 16-bit address buss 53, the 8-bit data buss 54, and the 8-line control buss 55.

The inputs of two 74LS138 3-to-8 decoders 56 and 57 are connected to the address buss 53 and the control buss 55. The outputs of the I/O strobe decoder 56 and memory decoder 57 are connected to the chip select inputs of the various peripheral circuits, thereby enabling the CPU 50 to selectively address these circuits.

A program memory 58 consists of six type 2716 memory devices which are industry standard ultraviolet eraseable, electrically programmable read-only-memories EPROMS. Each is capable of storing 2048 bytes, for a total capacity of 12 K bytes of program. The scratchpad random access memory RAM 59 consists of two type 2114 memory devices which are industry standard 1 K × 4 bit static RAMs, for a total capacity of 1 K bytes of data.

The CPU 50 interfaces with the CRT monitor 11 through the connector 60 and the CRT display controller circuits 61. The controller 61 is composed of a National Semiconductor DP 8352 CRT controller integrated circuit with its associated DM8678BTK character generator ROM, two type 2114 RAMs, two 74LS367 hex tri-state buffers, a 74LS244 octal tri-state buffer, a 74LS123 one-shot, and various logic gates (not believed necessary to show). These parts are connected such that the CPU 50, when directed by its program, can place the standard 6-bit ASCII codes of the characters to be displayed into the 2114s. Each position of the 32 character by 16 line display in the CRT 11 is associated with a particular address in RAM. Thus, to make a desired character appear in a particular position on the CRT screen, the CPU 50 need only place the ASCII code of that character into the proper address in RAM. The CRT controller chip scans the RAM continuously, producing through the character generator ROM the signals required to drive the CRT over the industry standard 3-line interface. This is a simple and very versatile method of controlling a CRT display.

The CPU 50 of FIG. 6 is interfaced with the keyboard 10 through the Intel 8279 keyboard controller 62. The 74LS138 3-to-8 line decoder 63 is used to decode the 3 encoded-scan outputs of the 8279 controller 62 into 8 decoded-scan lines. The keyboard 10 is constructed of normally-open key contacts interconnected in a matrix of scan and return lines. When a key is pressed by an operator, the key contacts are closed, connecting a scan line to a return line. The 8279 controller 62 monitors these connections and signals the CPU 50 through control buss 55 when connections are made. The CPU 50 responds to these connections as directed by the program memory 58. The compensation switches of the various wheel sensors and the menu select switch of the adjustment indicator 12 are connected as part of this switch matrix.

The CPU 50 interfaces with an Intel peripheral interface adapter PIA 64 which has 3 external I/O ports, 256 bytes of RAM, and a 14-bit interval timer. The timer is used to control the CPU 50 timing through interrupts transmitted through the control buss 55. The RAM 59 is used for the stack of the program. A portion of the I/O ports are used for interfacing the CPU 50 to the General Instruments ER2055 electrically alterable read-only-memory EAROM 65. This memory device has a capacity of 64 bytes, which can be erased, written and read by the CPU 50. Since it retains its memory when power is removed, unlike the 2114 RAMs, it is useful for storing the calibration parameters of the alignment system. The remainder of the I/O ports are used to interface the CPU 50 with the adjustment indicator 12 through the connector 35A and long cable 35. The adjustment indicator 12 is addressed as three 8-bit bytes, one each controlling the left bar graph 37, right bar graph 38 and menu indicators 39 to 45. To illuminate the desired LED, the program must simply set the corresponding bit of the appropriate byte.

The CPU 50 interfaces with the sensors 14L, 14R, 14LR and 14RR attached to the vehicle wheels and with the analog voltage conversion circuits through the Intel 8255 PIA 66 which has three I/O ports. The sensors attached to the vehicle wheels are connected through long cables 67L, 67R, 67LR and 67RR to the CPU 50 connector adapters 68L, 68R, 68LR and 68RR. The compensation switches (not shown) are connected in the keyboard matrix to the 8279 keyboard controller 62. The transducer control signals are supplied to the sensors by one port of the 8255 PIA 66. The transducers produce signals which are connected to the low-pass filters 69L, 69R, 69LR and 69RR, which remove high frequency noise from the signals. The outputs of the filters are connected to the inputs of a 4-to-1 analog multiplexer (MUX) 70, which is controlled by signals from the 8255 PIA 66. The output of the multiplexer is connected to the input of the automatic gain control (AGC) amplifier 71. This is a variable-gain amplifier, whose gain is controlled by the program through connections to the 8255 PIA 66. These connections control an analog switch which alters the feedback resistors of a non-inverting gain amplifier, which is formed from an operational amplifier and resistor network. The nominal gain values of 1, 2, 4, 8 and 16 allow the program to adjust the transducer signal levels to provide sufficient dynamic range for high resolution detection in the analog-to-digital convertor (ADC) 72. The ADC 72 is an Analog Devices AD574, a monolithic 12-bit analog-to-digital convertor. It is under the control of the program through connections to the control buss 55 and data buss 54.

Many error detection, correction, and prevention aids are included in the program which controls the computer 13. For example, the service person can obviously make mistakes when entering the alignment specifications and tolerances; accordingly, the CLEAR key 29 is provided on the keyboard 10. Pressing the CLEAR key 29 while entering specifications and tolerances causes the entry field the cursor arrow is pointing at to be cleared, or erased, so that the service person can correct a mistake and reenter the data. Also, repeatedly pressing the ENTER key 28 without keying in numerical data causes the cursor arrow to skip entry fields. Thus, the service person can easily correct a misentered specification by pressing ENTER SPECS key 19 to start the specification entry function, advancing the cursor arrow to the appropriate entry field, clearing the field, then re-entering the data.

A further error prevention feature prevents the service person from entering data in a manner that would be confusing. For example, if the keys were pressed in the sequence "2./", the "/" is confusing. Accordingly, the computer would ignore the "/" and simply would not respond when the service person pressed that key. The guiding rule is, if the computer 13 cannot possibly understand why a given numerical entry key was pressed, it will act as if that key had not been pressed. A summary of these rules is:

(1) No leading SPACE is allowed.
(2) "−" as first character of specification only. No negative tolerances are allowed.
(3) No "SPACE" after "." has been entered.
(4) No "SPACE" after "/" has been entered.
(5) No "." after "SPACE" has been entered.
(6) No "." after "/" has been entered.
(7) No "/" after "." has been entered.
(8) No "/" as first character after "SPACE".
(9) No "/" as first character after "−".
(10) No "/" as first character.
(11) Eight characters maximum.

A further set of error prevention features involves inhibiting the display of data on the CRT 11 and of adjustment indications on the portable indicator 12 unless such indications are known to be valid. For example, when the operator presses the ALIGN key 18, data is not presented on the CRT screen as shown in FIG. 3B unless the instruments have been compensated for runout, because the data could not possibly be valid under those conditions. The area where the numbers appear is simply left blank. This inhibition is selective, so that if only the left front wheel has been compensated, only the indication of left front camber will appear, since it is the only valid measurement. If the right front wheel is also compensated, the indications of camber and toe of both wheels is presented, as is the setback measurement, but indications of rear parameters are inhibited.

This type of indication inhibition extends to specification and tolerance entry requirements also. Data cannot be presented on the ADJUST screen (FIG. 3D) unless the appropriate specifications have been entered. Also, data cannot be presented on the portable adjustment indicator 12 which appears as unlit bar graphs unless the proper specifications and tolerances have been entered. The rule is simple: the system will present indicators which guide the service person through the alignment of the vehicle, but it cannot and will not provide such indications unless the service person executes those specification and tolerance entry procedures required to make such indications possible, and executes those wheel compensation procedures required to make such indications valid.

While the foregoing specification has set forth the application of LED bar graphs in a preferred embodiment, it should be understood that there are equivalent means for creating the display for the portable indicator 12. For example, there are electronic or graphic means such as meters of a type which overcome parallax problems and are conveniently visible to the service person. Also, there are displays such as black and white or color CRTs, gas discharge displays, liquid crystal displays (LCDs), dot matrix means and segmented displays. The purpose for providing an indicator is to allow a service person the ability to perform a better service.

As described above, the system relying on a CRT display can be implemented in a number of ways. The CRT adapted for use in this system may be one for graphically displaying meters. On the other hand, a printer can be used, or a gas discharge tube or dot matrix may be incorporated for the CRT display 11.

While the preferred embodiment has been described in detail, and certain components of that embodiment are indicated to have equivalents, it is understood that other parts and components have equivalents that can be organized and included in the system herein described.

What is claimed is:

1. Apparatus for guiding vehicle wheel alignment adjustments to known alignment specifications and tolerances, the apparatus comprising:
   (a) means for storing known alignment specification and tolerance data for a known vehicle;
   (b) means connected into said alignment specification and tolerance storing means for supplying thereto known vehicle alignment specification and tolerance data;
   (c) alignment adjustment display means for visually guiding the adjustments performed on the wheels of the known vehicle, said display means being connected into said storing means for receiving information therefrom;
   (d) vehicle wheel alignment instruments carried by the vehicle wheels for generating signals representative of the wheel positions of such vehicle, each said instrument being connected into said storing means for feeding said wheel position signals thereto; and
   (e) means in said apparatus for selecting specific alignment data generated by said instruments for comparison with similar known alignment data stored in said storing means, whereby said display means is activated to visually indicate the existence of differences between the specific alignment data generated by said instruments and corresponding similar known alignment data stored in said storing means.

2. The apparatus set forth in claim 1 wherein said means for storing known alignment specifications and tolerances for a known vehicle is a digital computer.

3. The apparatus set forth in claim 1 wherein said means for supplying known alignment specification and tolerance data into said storing means includes data input means.

4. Apparatus as set forth in claim 1 wherein said visual display means includes light bars having alignment tolerance lights flanked by misalignment indicating lights.

5. Apparatus as set forth in claim 1 wherein there is a second alignment adjustment display means for visually guiding the adjustments performed on the wheels of the known vehicle, said second alignment adjustment display means being connected into said storing means for receiving information therefrom.

6. The apparatus set forth in claim 1 wherein said alignment adjustment display means is portable.

7. The apparatus set forth in claim 1, wherein said alignment adjustment display means is a cathode ray tube.

8. Apparatus for guiding vehicle wheel alignment adjustments to known alignment requirements, the apparatus comprising:
   (a) a computer for storing predetermined alignment specifications and tolerance data therefor;
   (b) data input means connected into said computer for supplying said computer with alignment specification and tolerance data;
   (c) an alignment adjustment display for visually guiding the adjustments performed on the vehicle wheels, said alignment adjustment display being connected into said computer;
   (d) vehicle wheel alignment instruments carried by the vehicle wheels for generating signals representative of the wheel positions, each said instrument being connected into said computer; and
   (e) means in said apparatus for selecting predetermined alignment data generated by said instruments for comparison with similar alignment data stored in said computer, whereby said display is activated to visually indicate the presence of differences between the alignment data generated by said instruments and the similar alignment data stored in said computer.

9. A method for guiding vehicle wheel alignment adjustments to alignment requirements for a specific vehicle, said method comprising:
   (a) storing required alignment specification data corresponding to the desired wheel alignment data for the specific vehicle;
   (b) generating actual wheel alignment data from the specific vehicle
   (c) selecting specific actual alignment data from the specific vehicle for comparison with the stored required alignment data matching the selected specific actual alignment data; and
   (d) visually displaying the existence of differences between selected specific actual alignment data and the stored required matching alignment data, such that the display of the differences guides the operator in performing adjustments required by the specific vehicle.

10. The method of claim 9 wherein the adjustment of wheel alignment is verified upon visual display of substantial equality of actual wheel alignment data and stored required matching alignment data.

11. The method of claim 9 wherein the display of the differences guiding the operator in performing adjustments is rendered available adjacent the location of the operator.

12. The method of claim 9 wherein the visual display is presented simultaneously remote from and adjacent to the specific vehicle.

13. The method of claim 9 wherein absence of runout compensation in generating actual wheel alignment data inhibits the visual displaying of the existence of differences.

14. Apparatus for guiding vehicle wheel alignment adjustments to known alignment information respecting a vehicle under wheel alignment investigation, said apparatus comprising:
   (a) computer means for storing wheel alignment parameters for the vehicle under investigation;
   (b) wheel alignment instruments carried by the vehicle wheels for generating signals representative of wheel positions;
   (c) connections between said instruments and said computer means for transmitting the wheel position information into said computer means; and
   (d) means connected into said computer means for displaying the differences between stored alignment parameters and measured wheel position information for guiding the alignment adjustments on the vehicle wheels.

15. The apparatus as set forth in claim 14 wherein said means for displaying the differences between stored parameters and measured wheel position information comprises a cathode ray tube adjacent the vehicle.

16. The apparatus as set forth in claim 14 wherein said means for displaying the differences between stored parameters and measured wheel position information is a portable display.

17. The apparatus as set forth in claim 14 wherein said means for displaying the differences between stored parameters and measured wheel position information includes means for inhibiting presentation thereof in the absence of said alignment instruments being compensated for runout.

18. The apparatus as set forth in claim 14 wherein the differences are displayed in bar graphs and the alignment parameters are presented individually in relation to deviations from the parameters stored in said computer means.

19. The apparatus as set forth in claim 18 wherein said bar graphs are a series of lights ranging from green which indicates attainment of the adjustment, through yellow to red which indicates degrees of deviation from the attainment of the adjustment.

* * * * *